Figure 2:
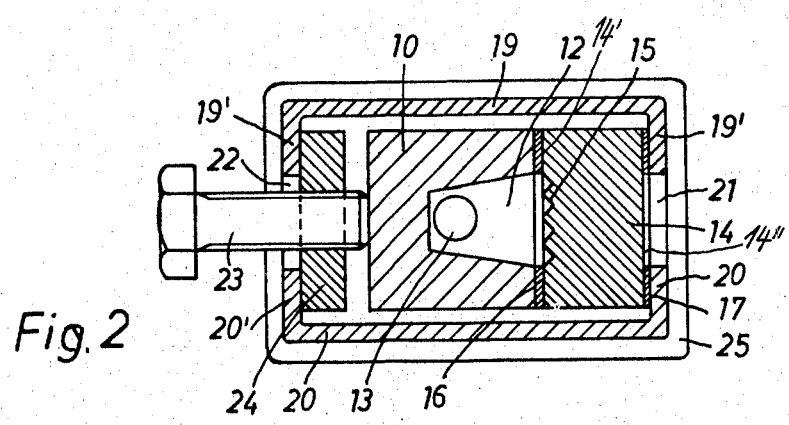

United States Patent [19]
Bonetti

[11] 3,817,205
[45] June 18, 1974

[54] REFLECTION-TYPE LEVEL INDICATOR
[75] Inventor: Giulio Bonetti, Milan, Italy
[73] Assignee: Klinger AG, Zug, Switzerland
[22] Filed: Apr. 6, 1973
[21] Appl. No.: 348,597

[30] Foreign Application Priority Data
Apr. 7, 1972 Italy .................................. 22911/72

[52] U.S. Cl. ............................ 116/118 R, 73/330
[51] Int. Cl. ......................................... G01f 23/00
[58] Field of Search ...... 116/118; 73/323, 324, 325, 73/326, 327, 328, 329, 330

[56] References Cited
UNITED STATES PATENTS
1,473,741   11/1923   Sargent .................................. 73/330
2,633,023   3/1953   Vanham .................................. 73/323
3,221,552   12/1965   Bonetti .................................. 73/330

FOREIGN PATENTS OR APPLICATIONS
258,221   9/1927   Great Britain ....................... 73/330

Primary Examiner—Louis J. Capozi
Attorney, Agent, or Firm—Karl W. Flocks

[57] ABSTRACT

A reflection-type level indicator for liquids incorporating a holding element having in a plane face a longitudinal groove forming a chamber containing the liquid the level of which is to be measured, and a crystal with two opposite plane faces, one of said faces adjoining said plane face of the holding element being provided with longitudinal prisms facing said chamber which is provided with openings communicating with a liquid container, said crystal and holding element being carried by an external mounting structure comprising two identical half shells held together by rings.

5 Claims, 2 Drawing Figures

PATENTED JUN 18 1974 3,817,205

REFLECTION-TYPE LEVEL INDICATOR

BACKGROUND OF THE INVENTION

The present invention relates to the construction of a reflection level indicator and particularly of a reflection level indicator for liquids which is provided with certain indispensable devices for obtaining correct function and a long period of life of the level indicator.

It is known in reflection level indicators to provide a crystal which has a first plane face and a second plane face opposite to the first one and formed with longitudinal prisms, which second face tightly contacts the surface of a holding element. This holding element is provided, on the side of the mentioned contact surface, with a longitudinal groove forming a space for receiving a liquid which is visible across the crystal.

The mentioned space is provided at its ends with an opening communicating with a container for the liquid the level of which shall be measured according to the principle of communicating tubes.

The level indicators of the aforementioned type which are presently in service are so constructed that the external structure can no longer be used for the reception of the crystal when the contact face of the external structure abutting the crystal has become damaged, for example owing to outflowing liquid, steam or gas.

It is an object of the present invention to provide an improved reflection level indicator in which the holding element of the crystal or the crystal itself are contained in an outer structure which consists in principle of a container having the form of a parallelepipedon defining two possible contact faces for the crystal, so that when the contact face abutting the crystal is damaged, owing to outflow of liquid, steam or gas, or owing to deformations caused by changes of temperature, the possibility is offered to mount the structure inversely by using the other contact face.

It is moreover to be remarked that level indicators of the aforementioned type are available in commerce, which employ crystals of different kinds. Therefore it is indispensable to provide for each indicator type its proper external structure for the reception of the crystal.

A further object of the present invention is the provision of a level indicator whose external structure for reception of the crystal and of the above described element forming the space for the liquid comprises a construction which is standardized in such manner that it can be adapted to other level indicators having crystals of different dimensions or size.

A further object of the invention is the provision of a level indicator of the above mentioned type in which the external structure for the reception of the crystal fundamentally consists of two lateral half shells of similar or identical construction, so that these shells can be produced from the same sectional or profiled material the length of which corresponds to the length of the crystal to be built-in.

Figure 1:
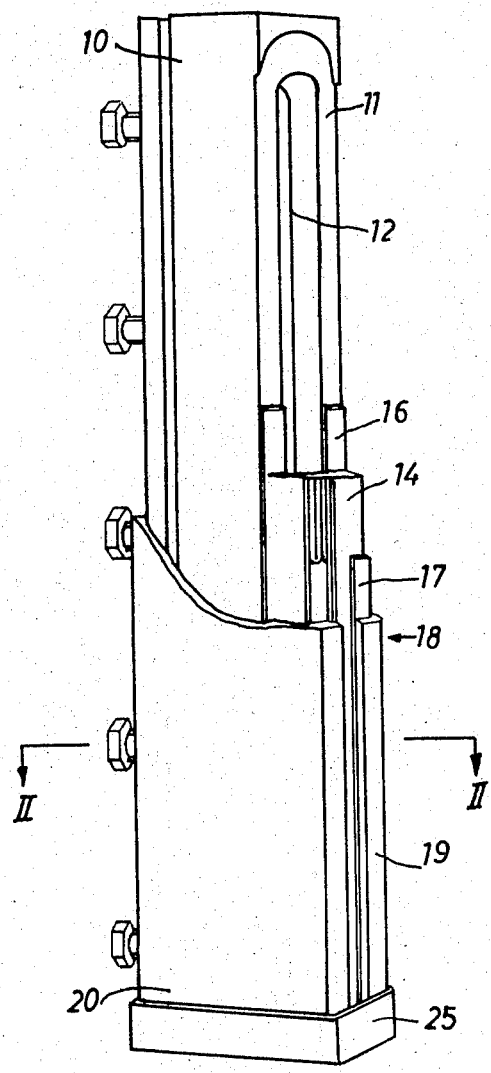

These and other features of the level indicator sccording to the invention shall be more fully described in the following specification by reference to the accompanying drawings in which:

FIG. 1 represents a perspective view of the level indicator according to the invention in which certain parts, for the sake of clearness have been omitted, FIG. 2 a cross section, rudimentary along the line 2—2 of FIG. 1.

Referring to the drawings it has to be remarked that a level indicator in principle comprises a holding element 10 of metal or another material, for example plastic, having the shape of a parallelepipedon which, on a plane side is provided with a longitudinal groove 12 forming a chamber for containing a liquid the level of which shall be measured. This chamber 12 communicates by an opening 13 at each end of the groove with a container for the liquid the level of which shall be measured.

Adjoining the holding element 10 having the shape of a parallelepipedon, there is maintained a crystal 14 also having the shape of a parallelepipedon, which is provided at one plane lateral face 14' with longitudinal prisms 15 which are mounted against the aforementioned space 12 for the reception of a liquid. As clearly shown in the drawings, there is arranged a seal 16 between the crystal 14 and the element 10.

The crystal 14 further is provided with a second side 14'' opposite said first mentioned side which is formed with a plane face for contacting by the intermediary of a seal 17 the face of an external reception structure 18 (FIG. 1).

As shown by the Figures this external structure 18 consists of a tubular casing having the shape of a parallelepipedon formed by two lateral half shells 19 and 20 of similar or identical construction and of C-shaped cross section.

The two half shells 19 and 20 which form the described external structure 18 are obtained by pressing of plates of identical profile, so that the preparation of the said half shells can be standardized for crystals of different width and length. It is accordingly clear, that the distance between the two half sheels 19 and 20 can be modified according to the width of the crystal 14 or of the corresponding body or holding element 10.

FIG. 2 further shows that the surfaces 19' and 20' of the two half shells forming the structure 18 have a smaller height than the half width of a crystal 14 so that they form, besides the two oppositely arranged plane faces for holding the crystal, also two longitudinal openings 21 and 22. The opening 21, when the parts are assembled serves for observation of the liquid level across the crystal, while the opening 22 serves as a gap for the locking screws or bolts 23 which are screwed through corresponding openings provided in a counter pressure plate 24 fixedly arranged between the casing 18 and the member 10, the screws pressing with their ends against the holding member 10, so that this latter is tightly pressed against the crystal 14.

Obviously the plate 24 can be formed, instead of a single piece of several individual plates, one for each locking screw.

The two half shells 19 and 20 forming the sides of the external structure 18 are maintained togther in assembled position by rings 25 arranged at predetermined spacings along the structure 18 (a single ring being shown in FIG. 1). These rings can either be simply pressed on the two half shells or secured in other manner, for example by welding, or the two half shells can be connected by other suitable means, which will not be described, since they are of no importance for the invention and can be had in various sizes, in order to enable the use of the main components of the apparatus according to the invention for different cross sections of crystals available on the market.

It becomes apparent from the description and the annexed drawings that the invention provides the construction of a reflection level indicator for liquids which is symmetrical with respect to the three orthogonal planes which comprise the geometric center of the structure as a common point.

In this manner there is obtained, as already mentioned, not only a single contact plane for the crystal but two contact planes, so that when any defect arises at the contact face of the structure 18, there exists the possibility to mount the structure inversely in order to use the other contact face. Since moreover, the two half shells are basically of identical shape they can be manufactured from the same section or profile material, resulting in considerable savings of production expenses, as the production of these components can be standardized.

I claim:

1. A liquid level indicator comprising two longitudinally adjoining prismatic plate members, one of said plate members having a longitudinal groove and the other of said plate members being of glass, said two plate members being in pressure relationship against each other in a casing whereby a channel for liquids is formed by said longitudinal groove of said one of said plate members and said glass plate member, said longitudinal groove being sealed toward the outside by said glass plate member being in pressure relationship thereagainst and also abutting on its outer surface against a glass support surface of said casing, said glass support surface of said casing including a slot through which said glass plate member acts as a display surface, said outer surface of said glass plate member taking up the sealing force furnished by a pressure bolt resting against a portion of said casing and acting on said plate member having the longitudinal groove therein, characterized in that said casing is formed as a one-piece tube-like body and in that the casing portion against which the pressure bolt rests is also formed as glass support with a viewing slot, whereby the pressure bolt projects outwardly therethrough and said glass plate member may be relocated to provide a display surface at either side of said casing.

2. A level indicator according to claim 1, characterized in that the casing comprises two longitudinally extending half shells, each half shell forming one half of both glass support surface whereby the half shells are being held together by rings secured to the half shells.

3. A level indicator according to claim 2, characterized in that said half shells are of identical cross-section.

4. A level indicator according to claim 3, characterized in that the cross-section of both half shells are substantially of C-shape, the depth of the half shell being smaller than one half of the width of the display surface.

5. A level indicator according to claim 1, characterized in that the casing is symmetrical with respect to the three orthogonal planes having their common point situated in the center of the structure.

* * * * *